(12) United States Patent
Sheng et al.

(10) Patent No.: US 11,394,189 B1
(45) Date of Patent: Jul. 19, 2022

(54) CABLE FIXING DEVICE AND ANTENNA

(71) Applicants: ROSENBERGER TECHNOLOGIES CO., LTD., Suzhou (CN); ROSENBERGER TECHNOLOGIES LLC, Budd Lake, NJ (US)

(72) Inventors: Linfeng Sheng, Suzhou (CN); Junyang Huang, Suzhou (CN); Youfang Huangfu, Suzhou (CN)

(73) Assignees: ROSENBERGER TECHNOLOGIES CO., LTD., Suzhou (CN); ROSENBERGER TECHNOLOGIES LLC, Budd Lake, NJ (US)

( * ) Notice: Subject to any disclaimer, the term of this patent is extended or adjusted under 35 U.S.C. 154(b) by 0 days.

(21) Appl. No.: 17/383,053

(22) Filed: Jul. 22, 2021

(30) Foreign Application Priority Data

Dec. 29, 2020 (CN) .......................... 202011588474.4

(51) Int. Cl.
| | |
|---|---|
| *H02G 3/30* | (2006.01) |
| *F16L 3/127* | (2006.01) |
| *F16L 3/13* | (2006.01) |
| *H02G 3/32* | (2006.01) |
| *H01Q 1/12* | (2006.01) |

(52) U.S. Cl.
CPC ................. *H02G 3/32* (2013.01); *H01Q 1/12* (2013.01); *F16L 3/127* (2013.01); *F16L 3/13* (2013.01)

(58) Field of Classification Search
CPC .... H02G 3/32; F16L 3/00; F16L 3/127; F16L 3/13
See application file for complete search history.

(56) References Cited

U.S. PATENT DOCUMENTS

| | | | | | |
|---|---|---|---|---|---|
| 2,004,679 | A | * | 6/1935 | Tinnerman | F16L 3/13 248/73 |
| 2,065,843 | A | * | 12/1936 | Van Uum | F16L 3/127 248/73 |
| 2,068,932 | A | * | 1/1937 | Quarnstrom | F16L 3/127 248/73 |
| 2,176,405 | A | * | 10/1939 | Lombard | H01R 9/16 248/73 |
| 2,453,980 | A | * | 11/1948 | Hartman | F16L 3/13 248/68.1 |
| 2,495,848 | A | * | 1/1950 | Kiesel | F16L 3/13 248/68.1 |

FOREIGN PATENT DOCUMENTS

| | | |
|---|---|---|
| CN | 205594207 U | 9/2016 |
| CN | 109891695 A | 6/2019 |
| CN | 110783863 A | 2/2020 |

\* cited by examiner

*Primary Examiner* — Tan Le
(74) *Attorney, Agent, or Firm* — Anova Law Group, PLLC

(57) ABSTRACT

A cable fixing device includes: a first arm including a first arm section for holding a cable and a second arm section for fixing the cable to a plate-shaped structure to which the cable fixing device is attached; and a second arm including a third arm section for holding the cable and a fourth arm section for fixing the cable to the plate-shaped structure. The first arm section and the third arm section are configured to cooperatively fix the cable, and the first arm section is connected to the third arm section only through the second arm section and the fourth arm section.

13 Claims, 2 Drawing Sheets

CABLE FIXING DEVICE AND ANTENNA

CROSS-REFERENCE TO RELATED APPLICATION

This application claims priority to Chinese Patent Application No. CN202011588474.4, filed on Dec. 29, 2020, the entire content of which is incorporated herein by reference.

TECHNICAL FIELD

The present disclosure relates to the technical field of mechanical fixing and, more particularly, to a cable fixing device for fixing a cable to a plate-shaped structure and an antenna including the cable fixing device.

BACKGROUND

Cable clamps have special requirements when being used to fix antenna cables. For example, assembling may be a problem. Existing ordinary cable clamps are often assembled after the cables are manually held in place in advance. The assembling operation is difficult. Further, space utilization may be another problem. The existing ordinary cable clamps have a main body concentrated on the back of a reflector. Under the circumstance that the space behind current 5G equipment and ordinary antenna is very limited, the ordinary cable clamps are often unable to fit in. Further, reliability may be another problem. The existing cable clamps fix the cables and the cable clamps at the same time. The cables do not contribute to the fixing of the cable clamps. A size of buckle arms of the cable clamps is often determined based on a thickness of the reflector, such that a fixing strength between the buckles and the reflector is limited and the cables easily fall off when the cables swing due to external forces.

SUMMARY

In accordance with the disclosure, there is provided a cable fixing device. The cable fixing device includes: a first arm including a first arm section for holding a cable and a second arm section for fixing the cable to a plate-shaped structure to which the cable fixing device is attached; and a second arm including a third arm section for holding the cable and a fourth arm section for fixing the cable to the plate-shaped structure. The first arm section and the third arm section are configured to cooperatively fix the cable, and the first arm section is connected to the third arm section only through the second arm section and the fourth arm section.

Also in accordance with the disclosure, there is provided an antenna. The antenna includes a transmitter board and a cable fixing device coupled to the transmitter board. The cable fixing device includes: a first arm including a first arm section for holding a cable and a second arm section for fixing the cable to the transmitter board to which the cable fixing device is attached; and a second arm including a third arm section for holding the cable and a fourth arm section for fixing the cable to the transmitter board. The first arm section and the third arm section are configured to cooperatively fix the cable, and the first arm section is connected to the third arm section only through the second arm section and the fourth arm section.

BRIEF DESCRIPTION OF THE DRAWINGS

To more clearly illustrate the technical solution of the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Figure 1:
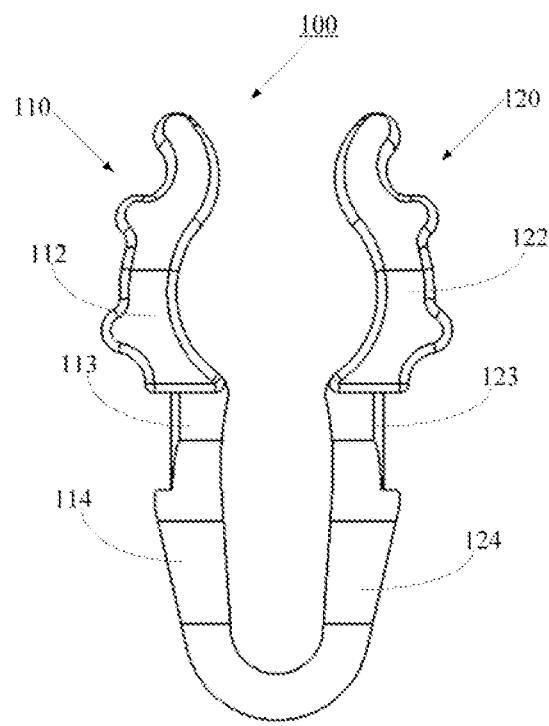
FIG. 1 shows a schematic view of a cable fixing device according to an example embodiment of the present disclosure.

Embodiments of the present disclosure are described in detail below with reference to the accompanying drawings. Same or similar reference numerals in the drawings represent the same or similar elements or elements having the same or similar functions throughout the specification. It will be appreciated that the described embodiments are some rather than all of the embodiments of the present disclosure. Other embodiments obtained by those having ordinary skills in the art on the basis of the described embodiments without inventive efforts should fall within the scope of the present disclosure.

The following technical problems exist in the existing technology.

For example, assembling may be a problem. Existing ordinary cable clamps are often assembled after the cables are manually held in place in advance. The assembling operation is difficult. Further, space utilization may be another problem. The existing ordinary cable clamps have a main body concentrated on the back of a reflector. Under the circumstance that the space behind current 5G equipment and ordinary antenna is very limited, the ordinary cable clamps are often unable to fit in. Further, reliability may be another problem. The existing cable clamps fix the cables and the cable clamps at the same time. The cables do not contribute to the fixing of the cable clamps. A size of buckle arms of the cable clamps is often determined based on a thickness of the reflector, such that a fixing strength between the buckles and the reflector is limited and the cables easily fall off when the cables swing due to external forces.

To address the foregoing technical problems, the present disclosure provides the solutions below.

For the assembling problem, the present disclosure improves a cable clamp installation process. The cable clamp is first snapped into feature holes of the reflector plate, and then the cable is inserted into the cable clamp. The step-by-step assembling is simple and efficient.

For the space utilization problem, in the present disclosure, the cable is inserted after the cable clamp is snapped into the reflector plate to effectively reduce a size of structures for fixing the cable. As such, an installation space on the back of the reflector plate may be effectively reduced to much smaller than a would-be installation space for ordinary cable clamps, and a limit of 5 mm height above the back of the reflector plate often required by 5G systems can be satisfied.

For the reliability problem, the cable clamp according to the present disclosure only needs to ensure the reliable fixing between the cable and the cable clamp. The inserted cable prevents the cable clamp from falling off the reflector plate.

In the process of installation, the cable clamp is fixed first. The cable clamp is snapped into the reflector plate and is self-locked by a fixing structure of the cable clamp. After being installed, the fixing structure of the cable clamp is located at the front of the reflector plate, and the cable is inserted into a clamping structure of the cable clamp still on the back of the reflector plate. The height of the clamping structure of the cable clamp still on the back of the reflector plate is slightly greater than a diameter of the cable, thereby substantially saving the installation space on the back of the reflector plate. After the cable clamp is installed, the cable is inserted into the cable clamp. The clamping structure of the cable clamp engages with the cable and deforms to apply a clamping force to the cable. An amount of deformation of the clamping structure may be adjusted to securely fixing the cable. The inserted cable applies a reverse force to the clamping structure of the cable clamp. The reverse force reinforces the fixing structure of the cable clamp to prevent the cable clamp from falling off the reflector plate, thereby ensuring the reliability of the cable clamp installation.

Through the foregoing technical solutions, the cable fixing device according to the present disclosure effectively saves the installation space to much smaller than the would-be installation space needed for the ordinary cable clamps. In addition, the cable fixing device according to the present disclosure improves the cable installation process, such that the installation is simple, easy to operate, and highly efficient. The cable fixing device according to the present disclosure fixes the cable which at the same time reinforces the fixing of the cable clamp. The reverse force by the cable makes the overall fixing more reliable. Moreover, the cable fixing device according to the present disclosure has a high fault tolerance and reduces impacts of material contraction and expansion and size deviations.

The cable fixing device according to the present disclosure is described in detail below with reference to the accompanying drawings.

FIG. 1 shows a schematic view of a cable fixing device 100 according to an example embodiment of the present disclosure. As shown in FIG. 1, the cable fixing device 100 includes a first arm 110. The first arm 110 includes a first arm section 112 for holding a cable (not shown) and a second arm section 114 for fixing the cable to a plate-shaped structure (not shown) to which the cable fixing device 100 is attached. In addition, the cable fixing device 100 further includes a second arm 120. The second arm 120 includes a third arm section 122 for holding the cable (not shown) and a fourth arm section 124 for fixing the cable to the plate-shaped structure (not shown) to which the cable fixing device 100 is attached. The second arm section 114 and the fourth arm section 124 are connected. As shown in FIG. 1, the second arm section 114 and the fourth arm section 124 are connected through their corresponding lower ends. The first arm section 112 is connected to the third arm section 122 only through the second arm section 114 and the fourth arm section 124.

Figure 2:
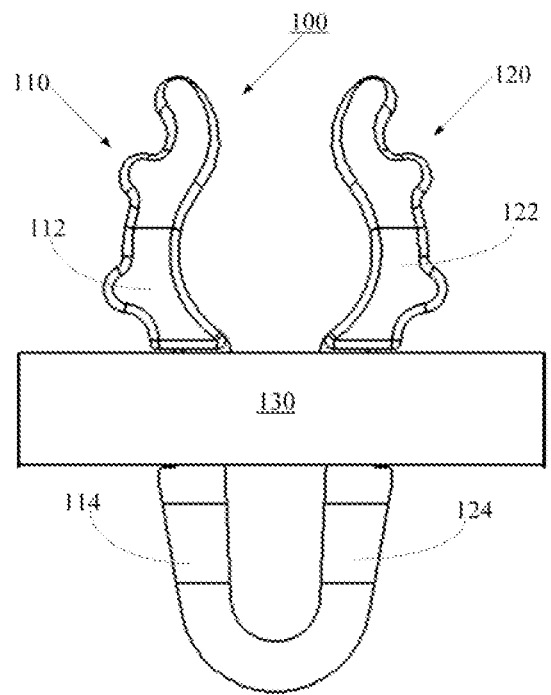
FIG. 2 shows a schematic view of a cable fixing device being fixed in a plate-shaped structure according to an example embodiment of the present disclosure.

FIG. 2 shows a schematic view of a cable fixing device 100 being fixed in a plate-shaped structure 130 according to an example embodiment of the present disclosure. As shown in FIG. 2, the cable fixing device 100 includes a first arm 110. The first arm 110 includes a first arm section 112 for holding a cable (not shown) and a second arm section 114 for fixing the cable to a plate-shaped structure 130 to which the cable fixing device is attached. In addition, the cable fixing device 100 further includes a second arm 120. The second arm 120 includes a third arm section 122 for holding the cable (not shown) and a fourth arm section 124 for fixing the cable to the plate-shaped structure 130 to which the cable fixing device is attached. The second arm section 114 and the fourth arm section 124 are connected. As shown in FIG. 2, the second arm section 114 and the fourth arm section 124 are connected through their corresponding lower ends. The first arm section 112 and the third arm section 122 are configured to cooperatively fix the cable. The first arm section 112 is connected to the third arm section 122 only through the second arm section 114 and the fourth arm section 124.

In addition, as shown in FIG. 1, in one embodiment, a first recessed arm section 113 is disposed on a side of the first arm 110 facing away from the second arm 120 at a section of the first arm 110 where the first arm section 112 and the second arm section 114 are connected together, and a second recessed arm section 123 is disposed on a side of the second arm 120 facing away from the first arm 110 at a section of the second arm 120 where the third arm section 122 and the fourth arm section 124 are connected together. In this way, before the cable is inserted between the first arm 110 and the second arm 120, the first recessed arm section 113 and the second recessed arm section 123 facilitate the cable fixing device 100 to be snapped into the plate-shaped structure 130 shown in FIG. 2 and FIG. 3. After the cable (e.g., the cable 140 having a circle cross-section in FIG. 4) is inserted between the first arm 110 and the second arm 120, the cable 140 keeps the first recessed arm section 113 and the second recessed arm section 123 snapped into the plate-shaped structure 130 more securely.

In one embodiment, the first recessed arm section 113 and the second recessed arm section 123 are configured to fix the cable fixing device 100 into an opening of the plate-shaped structure 130. The opening may be a through slot along a thickness direction of the plate-shaped structure. In one embodiment, the opening is a rectangular-shaped opening. During installation of the cable fixing device 100, the first arm 110 and the second arm 120 are pushed toward each other, such that a gap between the first arm 110 and the second arm 120 is reduced to facilitate the cable fixing device 100 to be snapped into the opening of the plate-shaped structure 130 more smoothly. A shape and a size of the opening and a shape and a size of the cable fixing device 100 match with each other to snap mechanically, thereby securing a reliable installation. After the cable fixing device 110 is inserted through the opening of the plate-shaped structure 130, the first recessed arm section 113 and the second recessed arm section 123 contact inner walls of the opening, the second arm section 114 and the fourth arm section 124 extend outward from one side of the plate-shaped structure 130 along its thickness direction (e.g., bottom side), and the first arm section 112 and the third arm section 122 extend outward from another side of the plate-shaped structure 130 along its thickness direction (e.g., top side). The cable fixing device 100 may be used in mobile communication systems and equipment. For example, the cable fixing device 100 may be used in the antenna equipment to fix the cable to the reflector plate.

Figure 3:
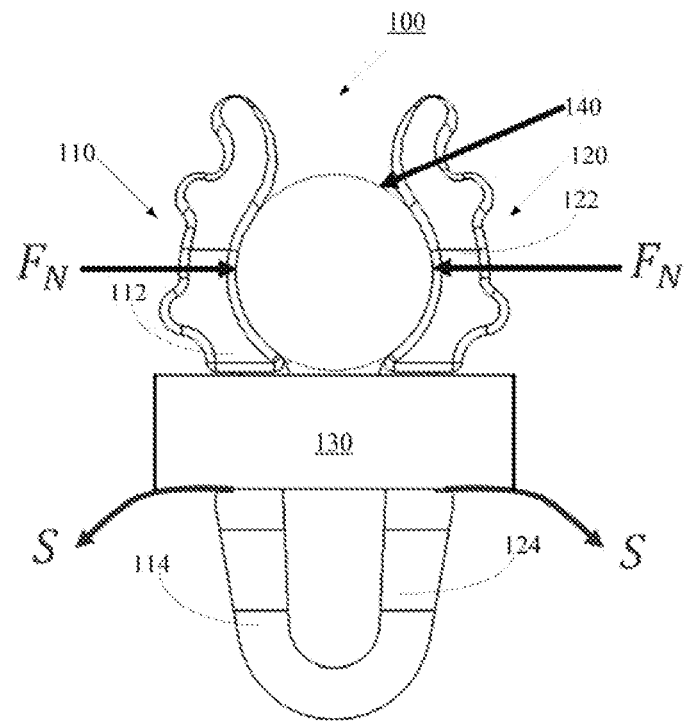
FIG. 3 shows a schematic view of a cable fixing device fixing a cable to the plate-shaped structure according to an example embodiment of the present disclosure.

In the embodiments shown in FIG. 1, FIG. 2, and FIG. 3, at least one of the first arm section 112 or the third arm section 122 includes an arc-shaped inner surface. In one embodiment, the first arm section 112 and the third arm section 122 are configured to clamp the cable (e.g., the cable 140 shown in FIG. 3).

FIG. 3 shows a schematic view of a cable fixing device 100 fixing a cable to the plate-shaped structure according to an example embodiment of the present disclosure. As shown in FIG. 3, the cable fixing device 100 includes a first arm 110. The first arm 110 includes a first arm section 112 for holding a cable 140 and a second arm section 114 for fixing the cable 140 to a plate-shaped structure 130 to which the cable fixing device is attached. In addition, the cable fixing device 100 further includes a second arm 120. The second arm 120 includes a third arm section 122 for holding the cable 140 and a fourth arm section 124 for fixing the cable 140 to the plate-shaped structure 130 to which the cable fixing device is attached. The second arm section 114 and the fourth arm section 124 are connected. As shown in FIG. 3, the second arm section 114 and the fourth arm section 124 are connected through their corresponding lower ends. The first arm section 112 and the third arm section 122 are configured to cooperatively fix the cable 140. The first arm section 112 is connected to the third arm section 122 only through the second arm section 114 and the fourth arm section 124.

During installation of the cable fixing device 100, the first arm 110 and the second arm 120 are pushed toward each other by a user, such that a gap between the first arm 110 and the second arm 120 is reduced to facilitate the cable fixing device 100 to be snapped into the opening of the plate-shaped structure 130 more smoothly. A shape and a size of the opening and a shape and a size of the cable fixing device 100 match with each other to snap mechanically, thereby securing a reliable installation. The user presses the cable 140 into a space between the first arm section 112 and the third arm section 122 of the cable fixing device 100.

In one embodiment, as shown in FIG. 3, after the cable 140 is pressed into the space between the first arm section 112 and the third arm section 122 of the cable fixing device 100, the first arm section 112 and the third arm section 122 apply forces to the cable 140 from both FN directions to securely hold the cable 140 between the first arm section 112 and the third arm section 122. Correspondingly, the cable 140 applies reverse forces in directions opposite to the FN directions to the first arm section 112 and the third arm section 122. In other words, after the cable fixing device is installed, expansion forces of the cable 140 reinforce the fixing of the cable fixing device 100 to the plate-shaped structure 130.

In one embodiment, to make it easier to press the cable 140 into the space between the first arm section 112 and the third arm section 122, an upper portion of each of the first arm section 112 and the third arm section 122 includes an arc-shaped guiding surface. The arc-shaped surfaces at the upper portions open widely to receive the cable 140 when the cable 140 is pressed into the space between the first arm section 112 and the third arm section 122.

In one embodiment, a distance between an end of the first arm section 112 facing away from the second arm section 114 and an end of the third arm section 122 facing away from the fourth arm section 124 is smaller than a maximum distance between the first arm section 112 and the third arm section 122. In this way, the cable 140 inserted between the first arm 110 and the second arm 120 is prevented from falling off. In other words, the opening of the cable fixing device 100 is smaller than the space holding the cable 140.

In one embodiment, to make it easier to fix the cable fixing device 100 without the cable 140 inserted to the plate-shaped structure 130, a mechanical tension force is configured at a bottom portion of the cable fixing device 100 connecting between the second arm section 114 and the fourth arm section 124 to keep the cable fixing device 100 in a stable shape. As such, the cable fixing device 100 without the cable 140 inserted can be pushed smoothly into the opening of the plate-shaped structure 130 while the mechanical tension force keeps the cable fixing device 100 without the cable 140 inserted to remain in the opening of the plate-shaped structure 130.

In one embodiment, after the cable 140 is pushed into the cable fixing device 100, the first arm 110 is pushed away from the second arm 120 by the inserted cable 140 and the second arm 120 is pushed away from the first arm 110 by the inserted cable 140, such that the first recessed arm section 113 and the second recessed arm section 123 are pushed away from each other as well. In this way, the inserted cable 140 pushes the first recessed arm section 113 and the second recessed arm section 123 to securely couple with the plate-shaped structure 130. As shown in FIG. 3, after the cable 140 is pressed into the space between the first arm section 112 and the third arm section 122 of the cable fixing device 100, the cable 140 pushes the cable fixing device 100 in S directions, such that the cable fixing device 100 is prevented from falling off from the plate-shaped structure 130 and the fixing between the cable fixing device 100 and the plate-shaped structure 130 becomes more secure.

In addition, in the embodiments shown in FIG. 1. FIG. 2, and FIG. 3, the first arm 110 and the second arm 120 are symmetrically arranged. In one embodiment, a distance between inner sides of the first arm 110 and the second arm 120 gradually increases along a longitudinal direction from the opening toward an inside of the cable fixing device 100. In one embodiment, the distance between the inner sides of the first arm 110 and the second arm 120 gradually decreases and then increases along the longitudinal direction from the opening toward the inside of the cable fixing device 100. In one embodiment, the distance between the inner sides of the first arm 110 and the second arm 120 gradually decreases, then increases, and decreases again along the longitudinal direction from the opening toward the inside of the cable fixing device 100.

In one embodiment, the cable fixing device 100 is configured to fix the cable 104 to the plate-shaped structure 130. The plate-shaped structure 130 may be a reflector of antenna or a circuit board of another device.

The present disclosure also provides an antenna. The antenna includes a transmitter board and the disclosed cable fixing device 100.

Figure 4:
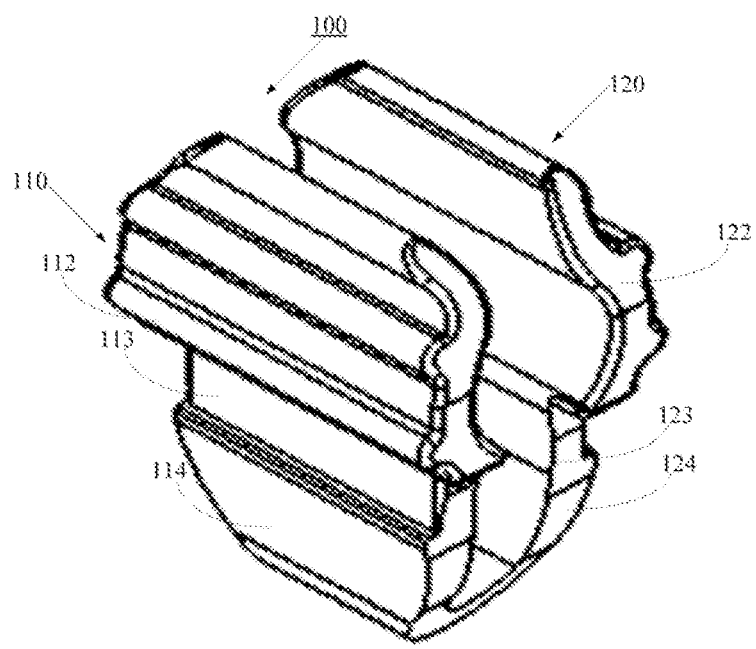
FIG. 4 shows a three-dimensional view of a cable fixing device according to an example embodiment of the present disclosure.

FIG. 4 shows a three-dimensional view of a cable fixing device according to an example embodiment of the present disclosure. As shown in FIG. 4, the cable fixing device 100 includes a first arm 110. The first arm 110 includes a first arm section 112 for holding a cable (not shown) and a second arm section 114 for fixing the cable to a plate-shaped structure (not shown) to which the cable fixing device is attached. In addition, the cable fixing device 10) further includes a second arm 120. The second arm 120 includes a third arm section 122 for holding the cable and a fourth arm section 124 for fixing the cable to the plate-shaped structure to which the cable fixing device is attached. The second arm section 114 and the fourth arm section 124 are connected. As shown in FIG. 4, the second arm section 114 and the fourth arm section 124 are connected through their corresponding lower ends. The first arm section 112 and the third arm section 122 are configured to cooperatively fix the cable. The first arm section 112 is connected to the third arm section 122 only through the second arm section 114 and the fourth arm section 124.

In the foregoing embodiments of the present disclosure, the cable fixing device effectively saves the installation space to much smaller than the would-be installation space needed for the ordinary cable clamps. In addition, the cable fixing device according to the present disclosure improves the cable installation process, such that the installation is simple, easy to operate, and highly efficient. The cable fixing device according to the present disclosure fixes the cable which at the same time reinforces the fixing of the cable clamp. The reverse force by the cable makes the overall fixing more reliable. Moreover, the cable fixing device according to the present disclosure has a high fault tolerance and reduces impacts of material contraction and expansion and size deviations.

Although various embodiments of the present disclosure have been described, it is apparent to those skilled in the art that various changes and modifications can be made without departing from the spirit and scope of the present disclosure to achieve one or more advantages of the present disclosure. For those skilled in the art, one or more components may be replaced by other components performing the identical functions. It should be understood that the features described herein with reference to a particular drawing can be combined with another feature in another drawing, even if such a case is not explicitly mentioned. In addition, the method of present disclosure may be implemented all by software being executed by a processor or may be implemented in a hybrid manner by a combination of hardware logic and software logic to achieve the same result. Such modifications to the embodiments of the present disclosure are intended to be covered by the appended claims.

What is claimed is:

1. A cable fixing device comprising:
a first arm including a first arm section for holding a cable and a second arm section for fixing the cable to a plate-shaped structure to which the cable fixing device is attached, the plate-shaped structure being a reflector;
a second arm including a third arm section for holding the cable and a fourth arm section for fixing the cable to the plate-shaped structure, wherein the first arm section and the third arm section are configured to cooperatively fix the cable, and the first arm section is connected to the third arm section only through the second arm section and the fourth arm section;
a first recessed arm section disposed on a side of the first arm at a section of the first arm where the first arm section and the second arm section are connected together; and
a second recessed arm section disposed on a side of the second arm facing away from the first arm at a section of the second arm where the third arm section and the fourth arm section are connected together;
wherein the first recessed arm section and the second recessed arm section are configured to fix the cable fixing device into an opening of the reflector, wherein the opening is rectangular-shaped, recessed surfaces of the first recessed arm section and the second recessed arm section are rectangular-shaped.

2. The device according to claim 1, wherein:
at least one of the first arm section or the third arm section includes an arc-shaped inner surface.

3. The device according to claim 2, wherein:
the first arm section and the third arm section are configured to clamp the cable.

4. The device according to claim 1, wherein:
a distance between an end of the first arm section facing away from the second arm section and an end of the third arm section facing away from the fourth arm section is smaller than a maximum distance between the first arm section and the third arm section.

5. The device according to claim 1, wherein:
a mechanical tension force is configured at a bottom portion of the cable fixing device connecting between the second arm section and the fourth arm section to keep the cable fixing device in a stable shape.

6. The device according to claim 1, wherein:
in a process of pressing the cable into the cable fixing device, the first arm is pushed away from the second arm and the second arm is pushed away from the first arm, and the first recessed arm section and the second recessed arm section are pushed away from each other.

7. The device according to claim 1, wherein:
the first arm and the second arm are symmetrically arranged.

8. The device according to claim 1, wherein:
a distance between inner sides of the first arm and the second arm gradually decreases and then increases along a longitudinal direction from an opening toward an inside of the cable fixing device.

9. The device according to claim 1, wherein:
a distance between inner sides of the first arm and the second arm gradually decreases, then increases, and decreases again along a longitudinal direction from the opening toward an inside of the cable fixing device.

10. The device according to claim 1, wherein:
the cable fixing device is configured to fix the cable to a reflector plate of an antenna.

11. An antenna comprising:
a reflector; and
a cable fixing device going through the reflector and including:
a first arm including a first arm section for holding a cable and a second arm section for fixing the cable to the reflector to which the cable fixing device is attached;
a second arm including a third arm section for holding the cable and a fourth arm section for fixing the cable to the reflector, wherein the first arm section and the third arm section are configured to cooperatively fix the cable, and the first arm section is connected to the third arm section only through the second arm section and the fourth arm section;
a first recessed arm section disposed on a side of the first arm at a section of the first arm where the first arm section and the second arm section are connected together; and
a second recessed arm section disposed on a side of the second arm facing away from the first arm at a section of the second arm where the third arm section and the fourth arm section are connected together;
wherein the first recessed arm section and the second recessed arm section are configured to fix the cable fixing device into an opening of the reflector, wherein the opening is rectangular-shaped, recessed surfaces of the first recessed arm section and the second recessed arm section are rectangular-shaped.

12. The antenna according to claim 11, wherein:
at least one of the first arm section or the third arm section includes an arc-shaped inner surface.

13. The antenna according to claim 12, wherein:
the first arm section and the third arm section are configured to clamp the cable.

* * * * *